United States Patent

Magno, Jr.

(10) Patent No.: US 8,944,388 B2
(45) Date of Patent: Feb. 3, 2015

(54) CLAMP FOR A SUPPORT BRACKET

(71) Applicant: Thomas & Betts International, Inc., Wilmington, DE (US)

(72) Inventor: Joey D. Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 13/765,842

(22) Filed: Feb. 13, 2013

(65) Prior Publication Data

US 2013/0313374 A1    Nov. 28, 2013

Related U.S. Application Data

(60) Provisional application No. 61/651,033, filed on May 24, 2012.

(51) Int. Cl.
*F16L 3/08* (2006.01)
*F16L 3/04* (2006.01)
*F16L 33/24* (2006.01)

(52) U.S. Cl.
CPC .. *F16L 3/04* (2013.01); *F16L 33/24* (2013.01)
USPC ............... 248/74.4; 248/56; 248/57; 248/58; 248/62; 248/63; 248/73; 248/74.1; 411/338

(58) Field of Classification Search
CPC ........................................................ F16L 3/20
USPC ........... 248/56, 57, 58, 62, 63, 73, 74.1, 74.4, 248/71; 411/338; 24/458
See application file for complete search history.

(56) References Cited

U.S. PATENT DOCUMENTS

| 1,269,733 | A | * | 6/1918 | Nelson | 59/85 |
| 1,787,017 | A |   | 6/1926 | Paul | |
| 1,793,932 | A |   | 5/1930 | Hite | |
| 2,375,513 | A | * | 5/1945 | Bach | 248/59 |
| 2,880,949 | A | * | 4/1959 | Fuss | 248/70 |
| 2,944,313 | A | * | 7/1960 | Reiland | 24/535 |
| 3,150,703 | A |   | 9/1964 | Preziosi | |
| 3,430,903 | A | * | 3/1969 | Mathes | 248/68.1 |
| 3,563,131 | A |   | 2/1971 | Ridley, Sr. | |
| 4,119,285 | A | * | 10/1978 | Bisping et al. | 248/72 |
| 4,575,295 | A | * | 3/1986 | Rebentisch | 411/85 |
| 4,806,895 | A | * | 2/1989 | Petrow | 336/65 |
| 4,820,096 | A |   | 4/1989 | Knight | |
| 4,842,237 | A | * | 6/1989 | Wollar | 248/548 |
| 4,854,796 | A |   | 8/1989 | Wise | |
| 4,936,530 | A | * | 6/1990 | Wollar | 248/71 |
| 4,971,272 | A |   | 11/1990 | Gudridge et al. | |
| 5,599,148 | A | * | 2/1997 | Hirose | 411/175 |
| 6,575,680 | B2 |   | 6/2003 | Herb et al. | |
| 6,796,907 | B2 |   | 9/2004 | McGuire et al. | |

(Continued)

*Primary Examiner* — Terrell McKinnon
*Assistant Examiner* — Michael McDuffie
(74) *Attorney, Agent, or Firm* — Snyder, Clark, Lesch & Chung LLP

(57) ABSTRACT

A clamp comprises a fastener, a clamp body, and a clamp leg. The clamp body comprises a housing including a cavity and a housing cavity; and a curved arm extending from the housing. The clamp leg comprises a leg body including a leg cavity, and a foot member. The clamp body and the clamp leg are attachable to and detachable from each other, and a portion of the leg body can be inserted into or removed from the housing cavity, and when the portion of the leg body is inserted into the housing cavity, the cavity and the leg cavity form a passageway for the fastener so that threads of the fastener are not externally exposed.

20 Claims, 14 Drawing Sheets

(56) References Cited

U.S. PATENT DOCUMENTS

| | | | |
|---|---|---|---|
| 6,991,198 B1* | 1/2006 | Roth | 248/58 |
| 7,387,285 B2 | 6/2008 | Thomason et al. | |
| 7,766,594 B2* | 8/2010 | Nehls | 411/435 |
| 8,186,024 B2* | 5/2012 | Hatsios et al. | 24/457 |
| 8,322,661 B2* | 12/2012 | Oh | 248/62 |
| 2005/0056735 A1* | 3/2005 | Fedewa | 248/56 |
| 2006/0249636 A1* | 11/2006 | Thiedig et al. | 248/74.4 |
| 2008/0273938 A1* | 11/2008 | Rowe et al. | 411/102 |
| 2010/0096510 A1* | 4/2010 | Oh | 248/62 |
| 2010/0260573 A1* | 10/2010 | Gardner et al. | 411/81 |
| 2012/0292462 A1* | 11/2012 | Marshall | 248/74.2 |
| 2013/0215381 A1* | 8/2013 | Raghuprasad | 351/178 |

\* cited by examiner

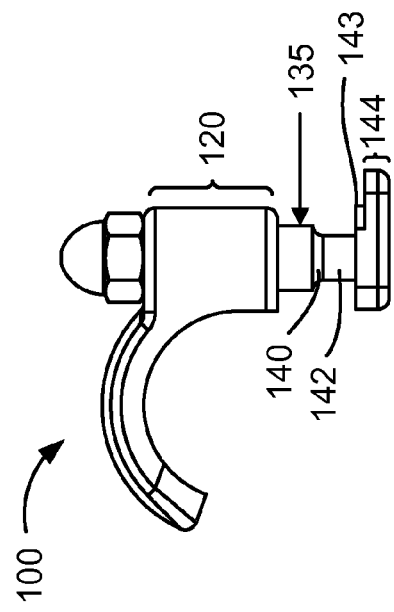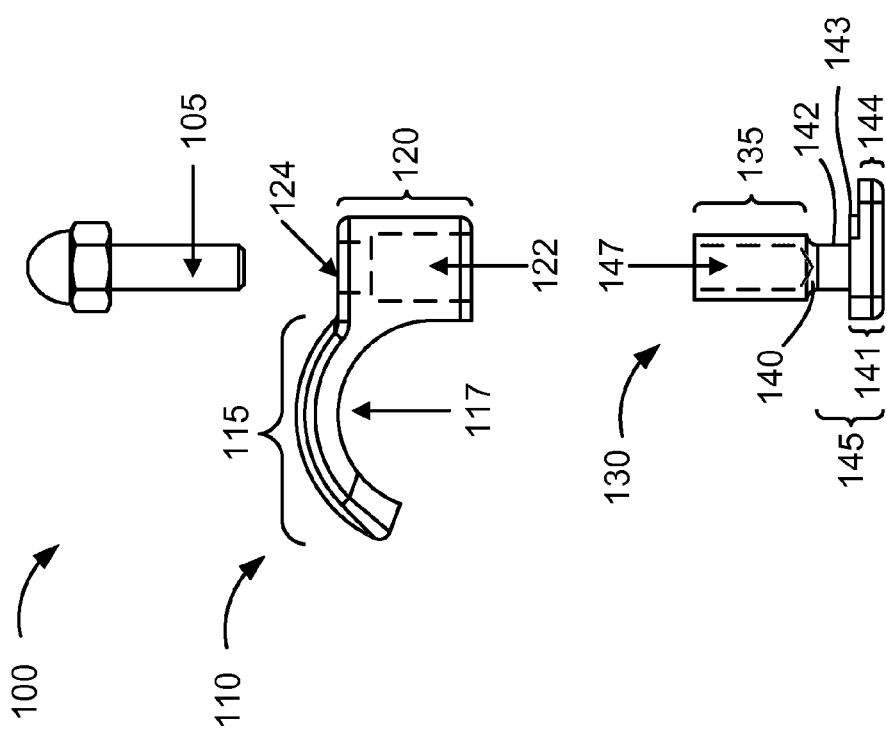

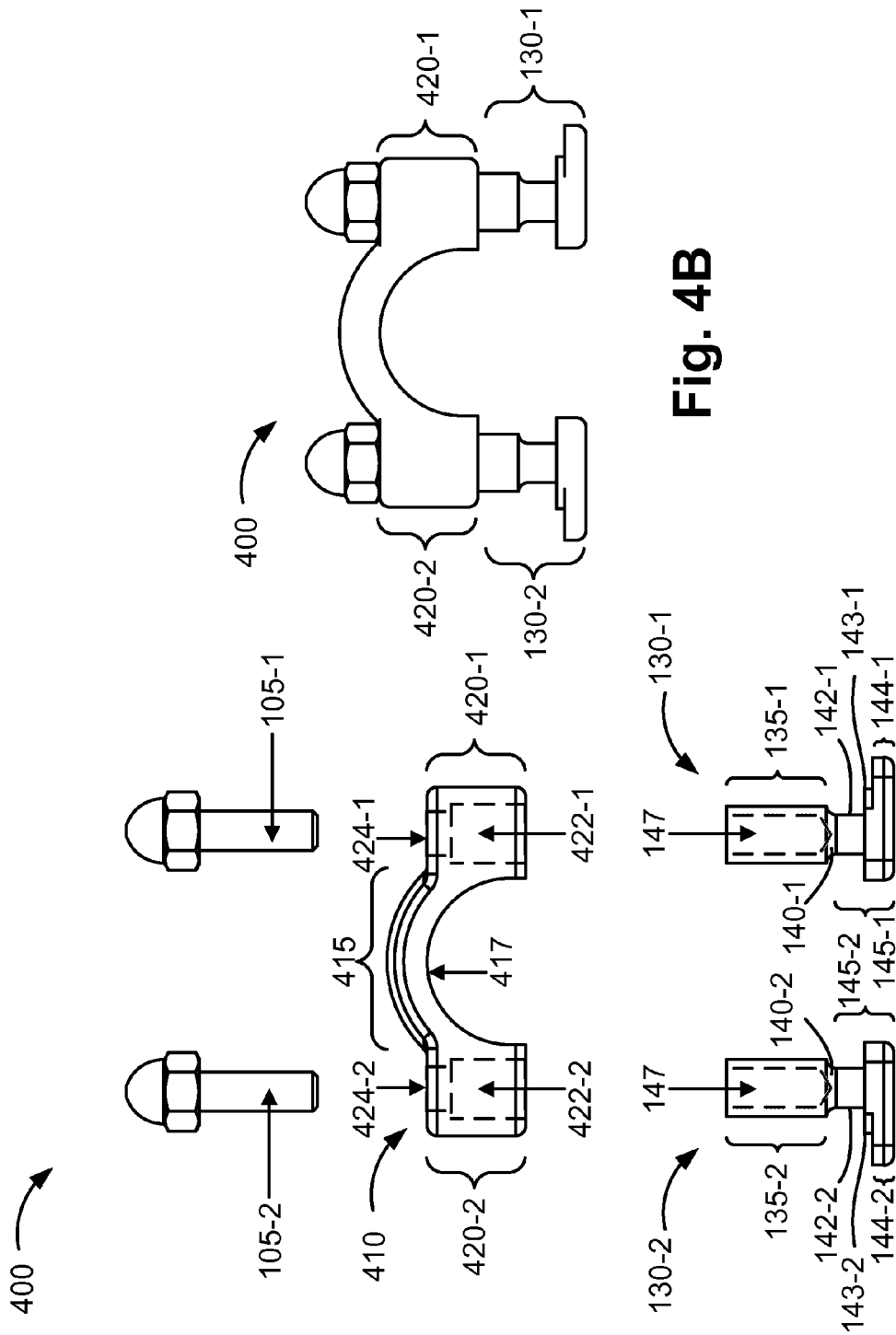

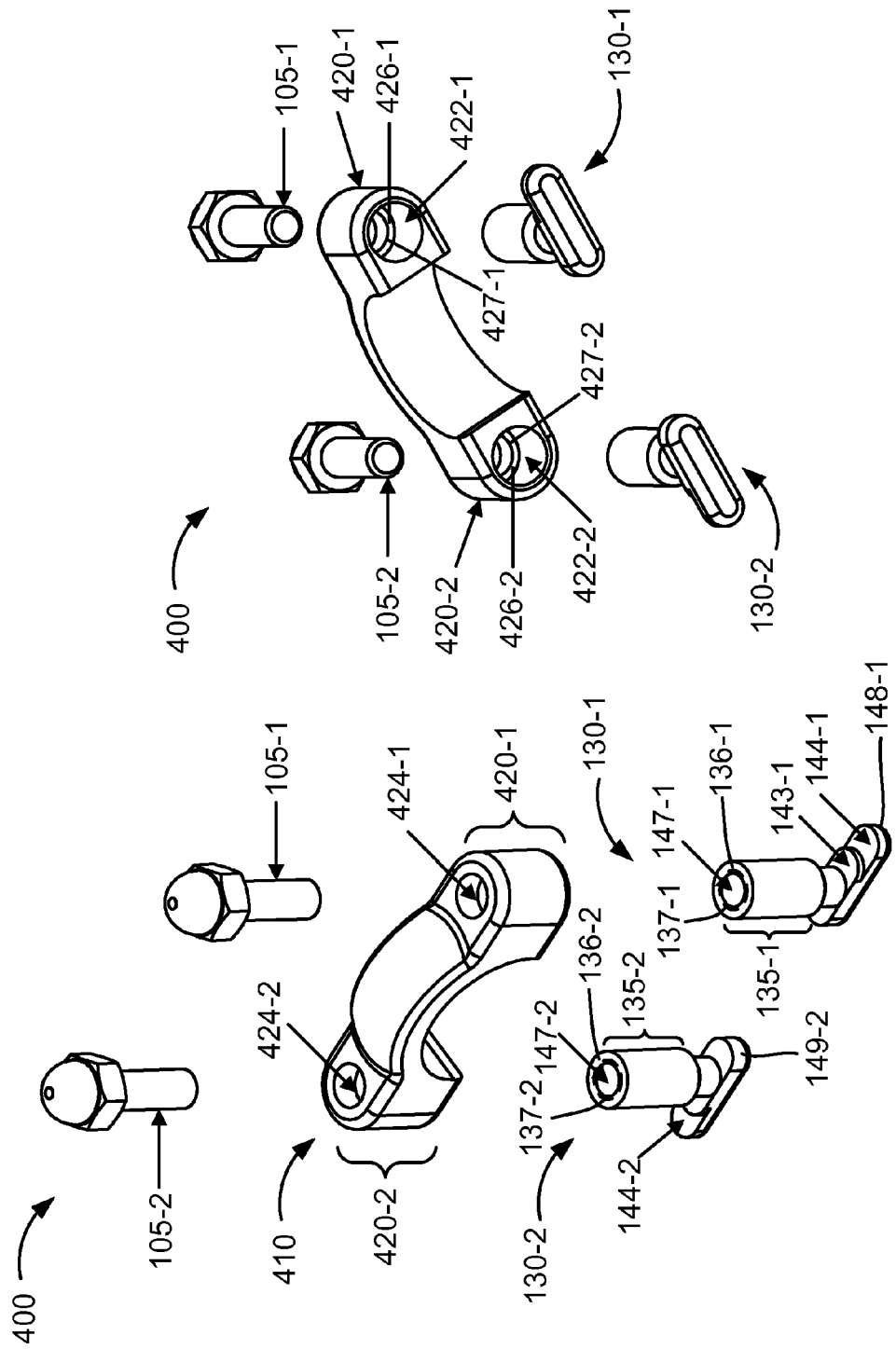

CLAMP FOR A SUPPORT BRACKET

CROSS-REFERENCE TO RELATED APPLICATION

This application claims priority under 35 U.S.C. §119, based on U.S. Provisional Patent Application No. 61/651,033, filed May 24, 2012, the disclosure of which is hereby incorporated by reference herein.

BACKGROUND

Mounting systems can be used in a variety of industries, such as food processing and pharmaceutical venues. Mounting systems are typically used to mount pipes, conduits, and tubes. These mounting systems are inherently difficult to clean, inspect, and by design are susceptible to accumulating various contaminants including dirt, insects, etc.

BRIEF DESCRIPTION OF THE DRAWINGS

FIG. 1A is a diagram illustrating an exploded, side view of an exemplary embodiment of a clamp;

FIG. 1B is a diagram illustrating a side view of the clamp;

FIG. 4A is a diagram illustrating an exploded, side view of another exemplary embodiment of a clamp;

FIG. 4B is a diagram illustrating a side view of the clamp;

FIGS. 4C and 4D are diagrams illustrating isometric views of the clamp;

DETAILED DESCRIPTION OF PREFERRED EMBODIMENTS

Figure 1D:
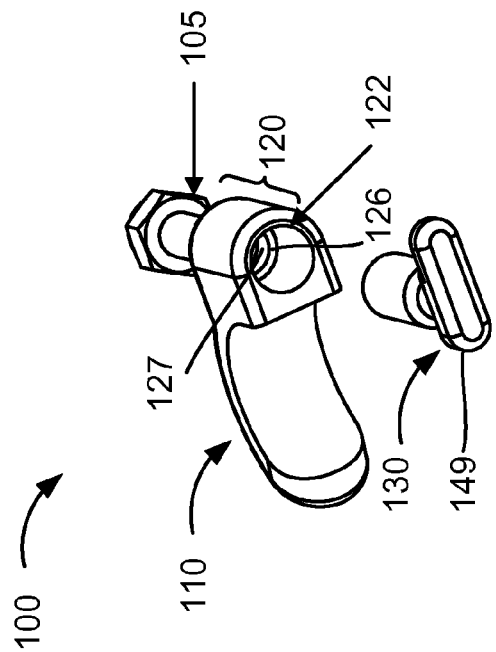
FIGS. 1C and 1D are diagrams illustrating isometric views of the clamp.

The following detailed description refers to the accompanying drawings. The same reference numbers in different drawings may identify the same or similar elements.

According to an exemplary embodiment, a clamp includes a clamp body and a clamp leg. According to an exemplary embodiment, the clamp body includes an annular cavity to receive the clamp leg. According to an exemplary embodiment, the annular cavity and the clamp leg each includes internal female threads. According to an exemplary embodiment, a fastener (e.g., a bolt) fastens the clamp body to the clamp leg such that no threading is externally exposed.

According to an exemplary embodiment, a bracket includes slots to receive the clamp leg. According to an exemplary embodiment, when attaching the clamp to the bracket, the clamp leg rotates, which is caused by tightening the fastener, and allows a foot portion of the clamp leg to anchor against a wall of the bracket. As the fastener is continued to be tightened, the clamp body and the clamp leg may be urged together, and the clamp may be further affixed to the bracket.

FIG. 1A is a diagram illustrating an exploded, side view of an exemplary embodiment of a clamp. Clamp 100 includes a fastener 105, a clamp body 110, and a clamp leg 130. Clamp 100 may be made from various materials, such as, for example, metal (e.g., stainless steel, aluminum, etc.) or a non-metallic material (e.g., plastic, a composite, etc.), depending on the application (e.g., food-grade, pharmaceutical, etc.) of clamp 100.

Fastener 105 includes a threaded element. For example, as illustrated in FIG. 1A, fastener 105 may be implemented as an acorn-head bolt. According to other implementations, fastener 105 may be another type of bolt, a screw, etc. Clamp body 110 includes an arm 115 and a housing 120. As illustrated, arm 115 extends from housing 120 in an arched or curved manner. Arm 115 and housing 120 define a surface 117 contoured to receive a conduit or other object having a curved surface for clamping. Housing 120 includes an annular cavity 122 and an annular cavity 124. Annular cavity 122 has a different diameter than annular cavity 124. For example, annular cavity 124 has a smaller diameter than annular cavity 122. Annular cavity 122 is contoured to receive clamp leg 130. Annular cavity 124 is contoured to receive fastener 105. According to an exemplary implementation, a surface of housing 120 that defines an opening of annular cavity 124 is substantially flat to receive a head of fastener 105 (e.g., the acorn-head of the bolt), as illustrated in FIG. 1B. Annular cavity 124 includes female threads. Annular cavity 122 and annular cavity 124 are described further below.

Clamp leg 130 includes a leg body 135, a tapered portion 140, and a foot portion 145. Leg body 135 has a tubular shape that is contoured to be received by annular cavity 122 of clamp body 110. Clamp leg 130 includes an annular cavity 147. As illustrated, annular cavity 147 extends a length of leg body 135. Annular cavity 147 includes female threads and is contoured to receive fastener 105. Annular cavity 147 may have a diameter that is substantially the same as a diameter of annular cavity 124. Tapered portion 140 is formed between leg body 135 and foot portion 145.

Foot portion 145 includes an ankle portion 142, an extending member 143, and a locking member 144. Ankle portion 142 has a tubular shape that extends from tapered portion 140. As illustrated, extending member 143 and locking member 144 include a step-configuration in which locking member 144 extends further laterally outward relative to extending member 143. Extending member 143 and locking member 144 (also referred to collectively as a foot member 141) extend substantially perpendicular to leg body 135, tapered portion 140 and ankle portion 142. As described further below, extending member 143 and locking member 144 are configured to provide a locking feature to allow clamp 100 to securely attach to a bracket.

FIG. 1B is a diagram illustrating a side view of an assembled clamp 100. Referring to FIGS. 1A and 1B, during an assembly process, a user inserts leg body 135 of clamp leg 130 into annular cavity 122. The user inserts fastener 105 into annular cavity 124 and annular cavity 147 of clamp leg 130. As the user turns fastener 105, clamp leg 130 is urged toward clamp body 110. As illustrated, when assembled, clamp 100 does not expose any threading.

Figure 1C:
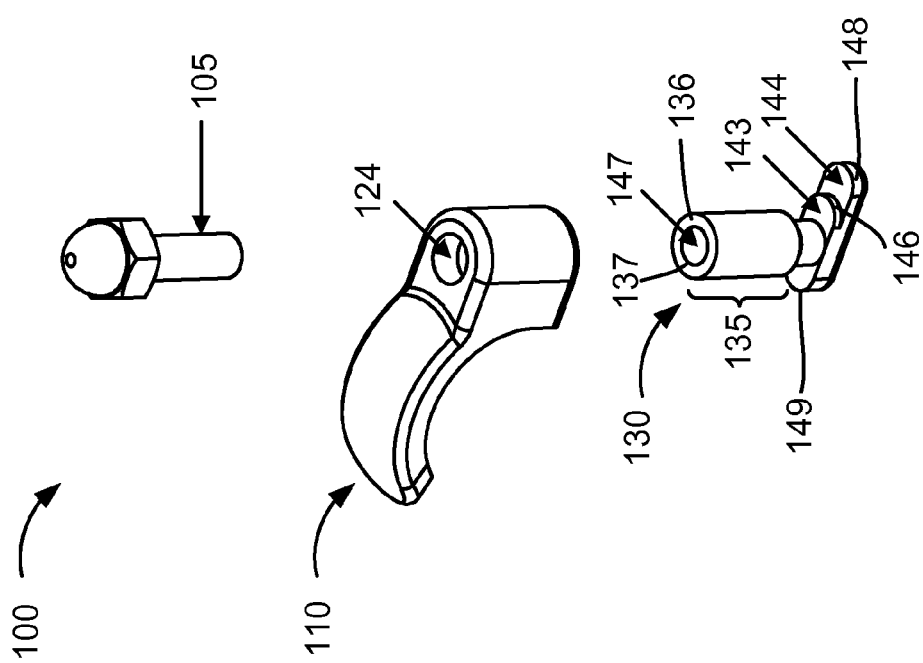

FIGS. 1C and 1D are diagrams illustrating isometric views of clamp 100. Referring to FIG. 1C, extending member 143 includes a curved side surface 146. Additionally, locking member 144 includes a curved side surface 148. FIGS. 1C and 1D illustrate that extending member 143 and locking member 144 form a curved side surface 149.

Referring to FIG. 1C, a top surface 136 of leg body 135 defines an opening 137 of annular cavity 147. FIG. 1D illustrates an inner surface 126 of housing 120 that defines an opening 127 of annular cavity 122. A female-threaded passageway is provided by annular cavity 124 and annular cavity 147. During the process of assembly, while turning fastener 105, fastener 105 urges top surface 136 to meet inner surface 126 and for openings 137 and 127 to meet.

Figure 2A:
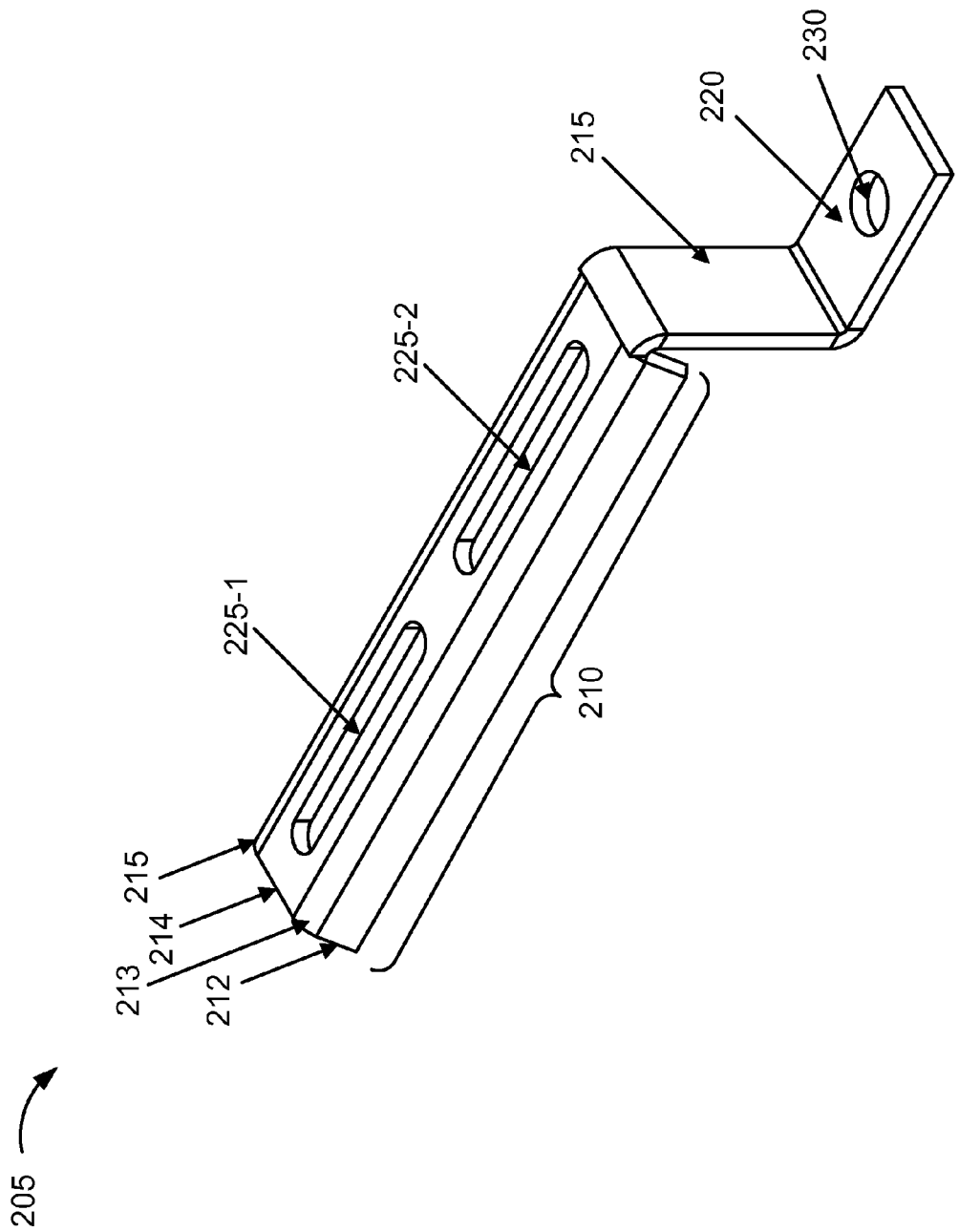
FIGS. 2A and 2B are diagrams illustrating isometric views of an exemplary embodiment of a bracket.
Figure 2B:
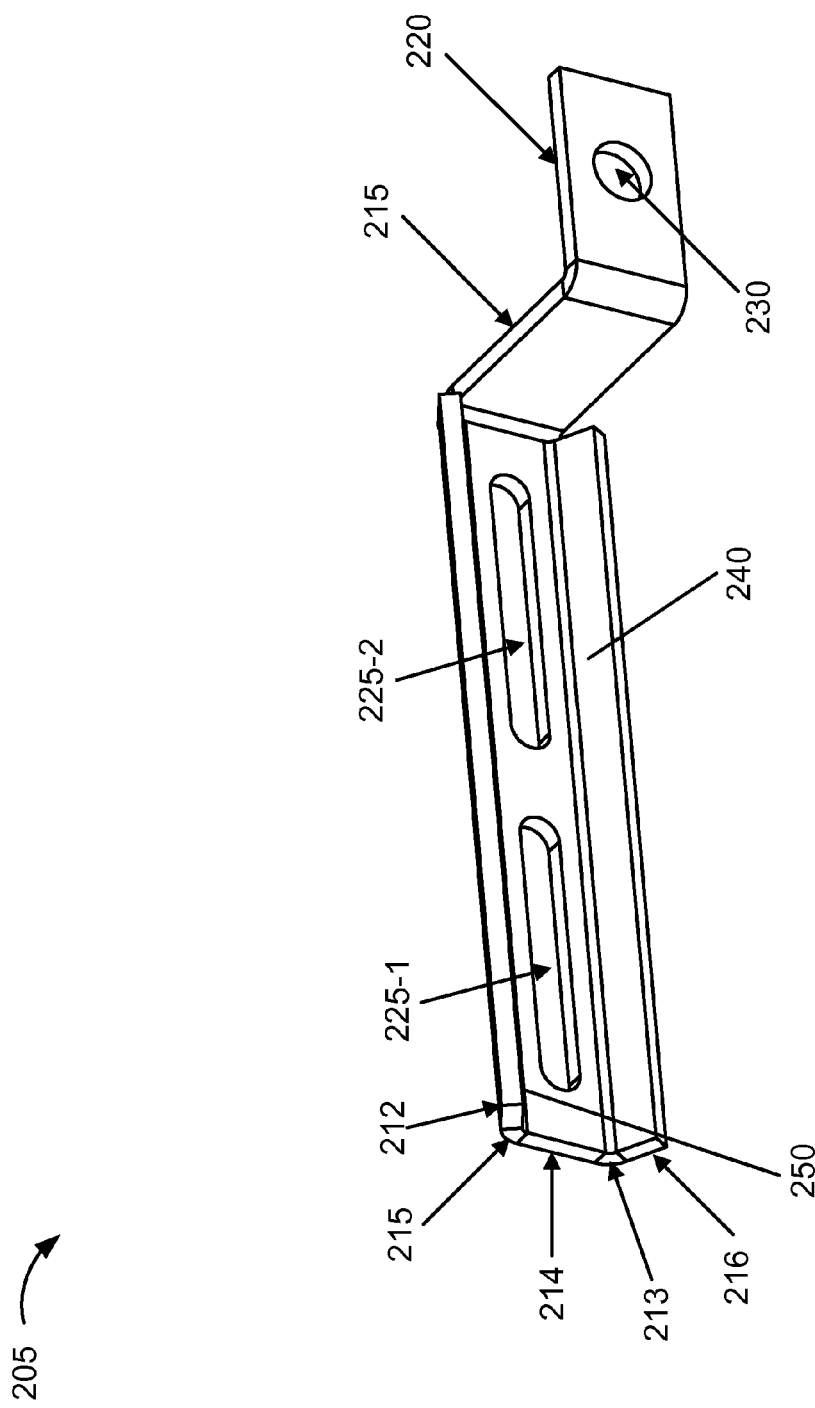

FIGS. 2A and 2B are diagrams illustrating isometric views of an exemplary embodiment of a bracket. Referring to FIG. 2A, a bracket 205 has a Z-bracket configuration that includes a slotted arm 210, a spacer 215, and an arm 220. Bracket 205 may be made from various materials, such as, for example, metal (e.g., stainless steel, aluminum, etc.) or a non-metallic material (e.g., plastic, a composite, etc.), depending on the application (e.g., food-grade, pharmaceutical, etc.) of bracket 205.

Slotted arm 210 has a C-like configuration. Slotted arm 210 includes a side 212, a side 213, a side 214, a side 215, and a side 216. Referring to FIG. 2B, sides 213 and 215 are curved and sides 212 and 216 extend outwardly and angled from side 214. As illustrated in FIGS. 2A and 2B, slotted arm 210 includes slots 225-1 and 225-2 (also referred to collectively as slots 225 and individually as slot 225). Spacer 215 is substantially perpendicular to arm 210 and arm 220. Arm 220 includes a hole 230. Referring to FIG. 2B, side 216 includes a surface 240 and side 212 includes a surface 250. As described further below, surface 240 or surface 250 may come into contact with curved side surface 148 of clamp leg 130 when clamp 100 is attached to bracket 205.

Figure 3A:
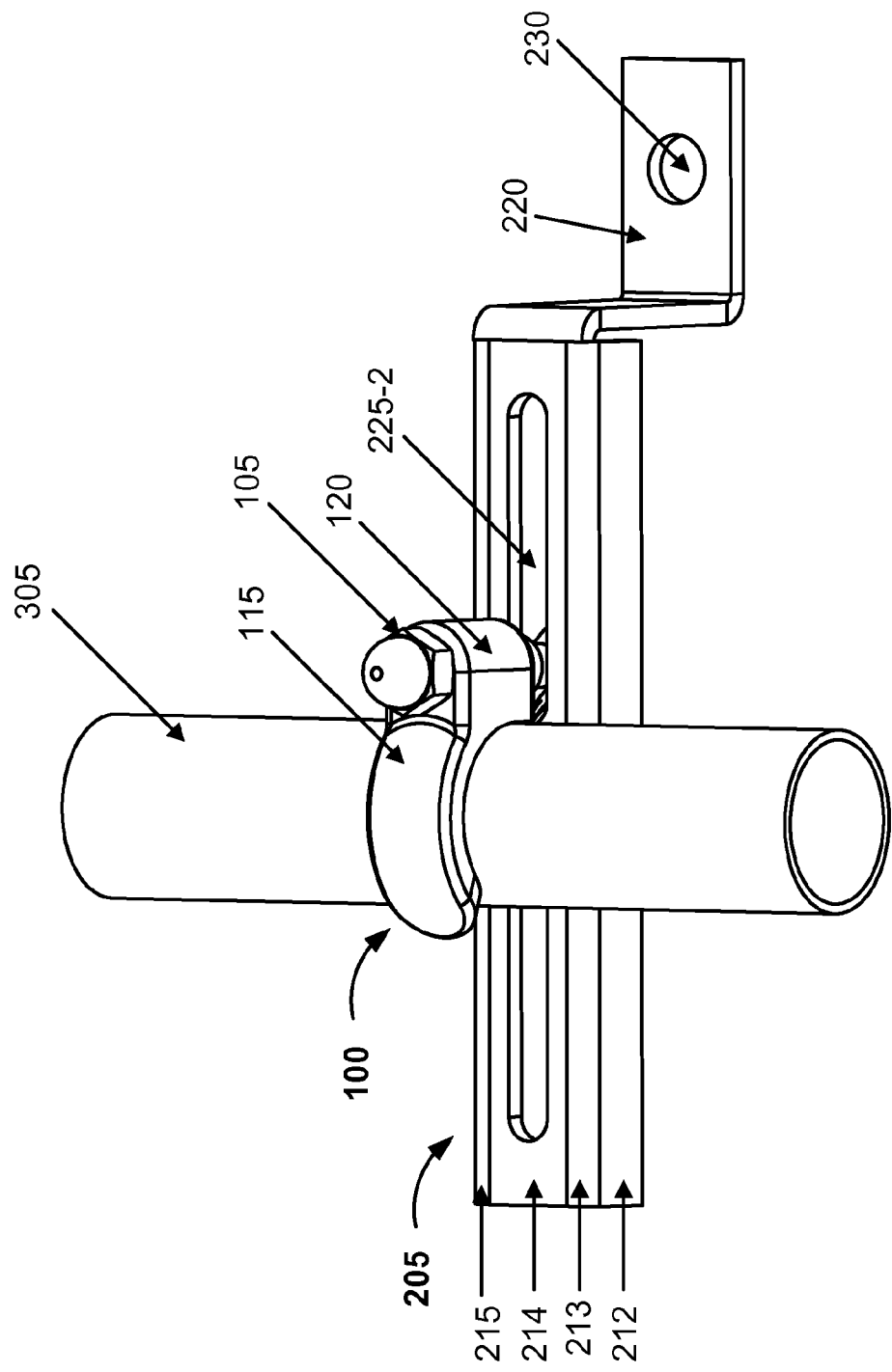
FIGS. 3A-3C are diagrams illustrating isometric views of the bracket and the clamp.
Figure 3B:
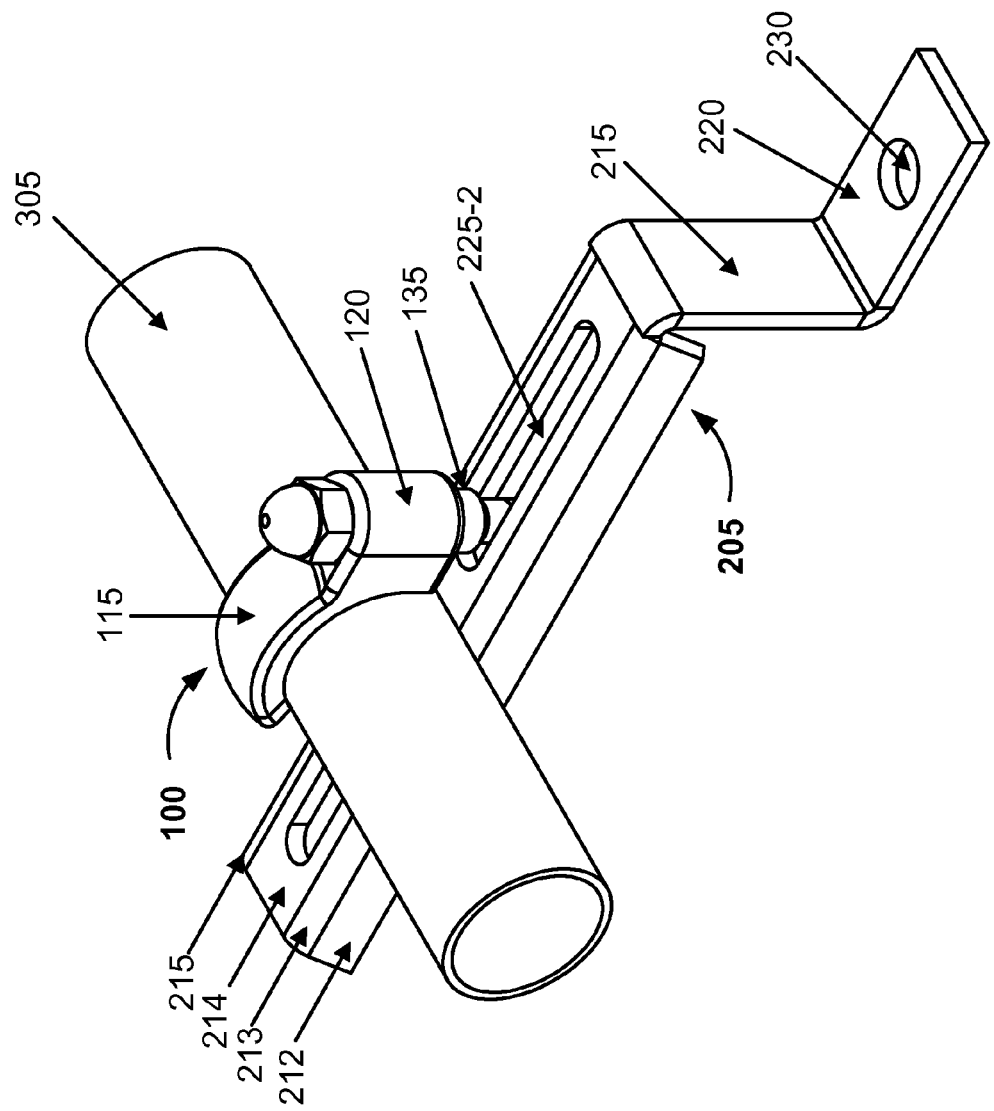
Figure 3C:
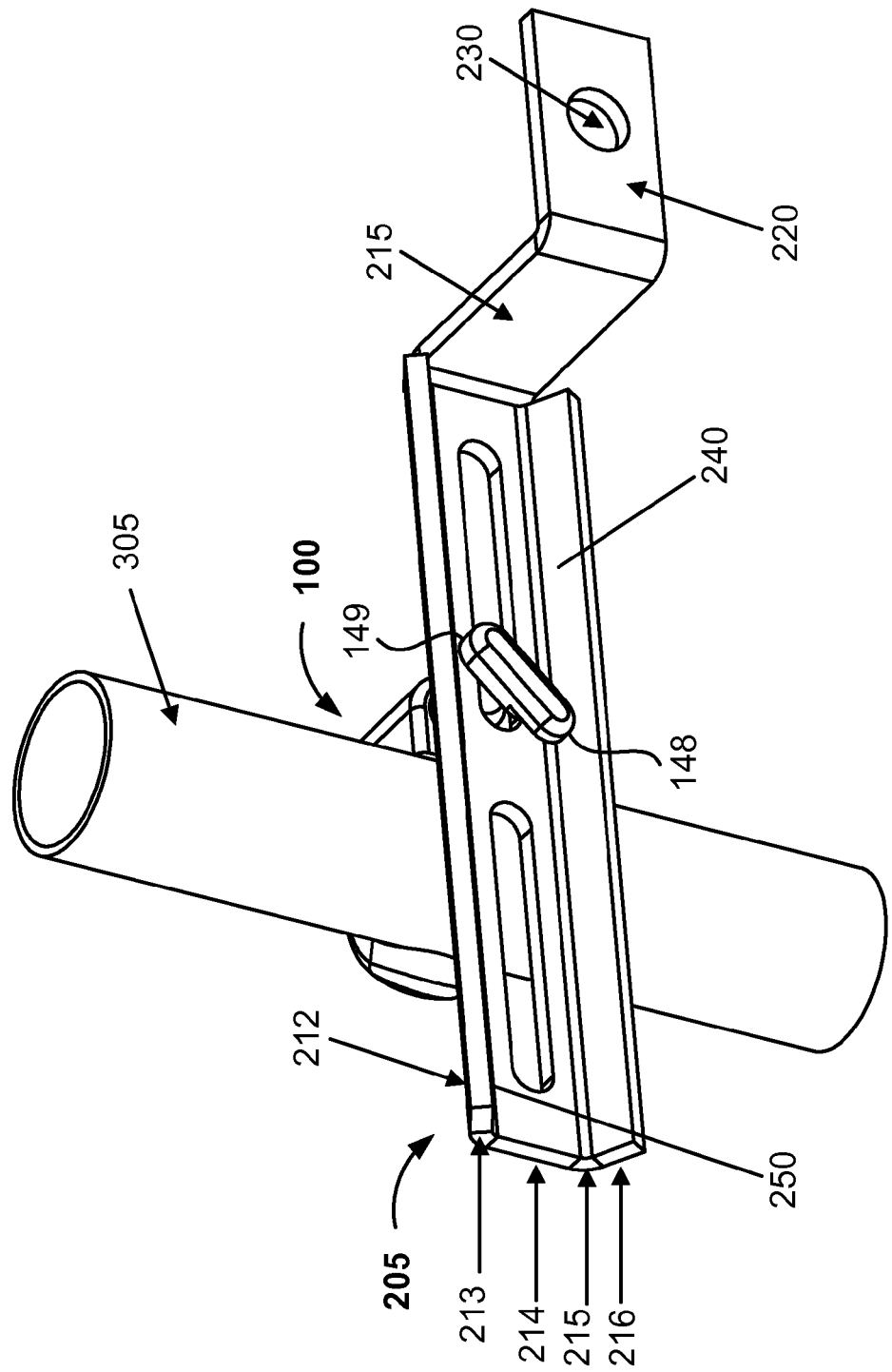
Figure 3D:
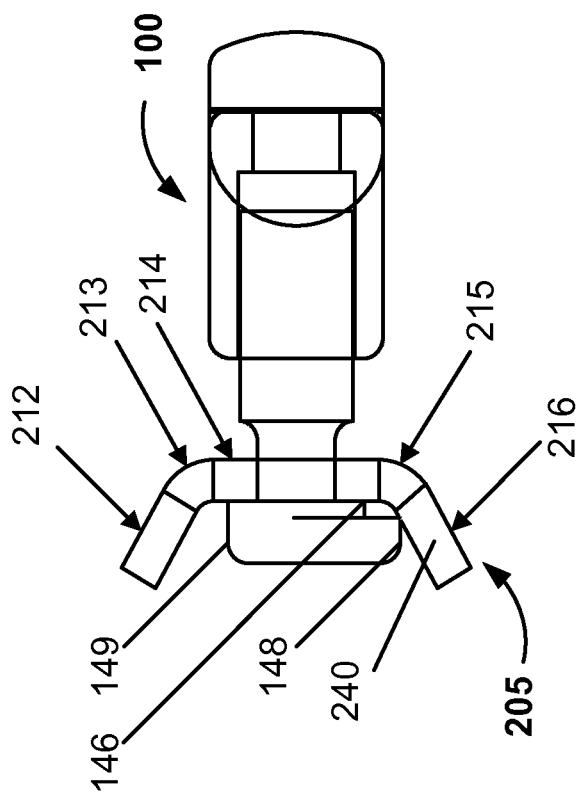
FIG. 3D is a diagram illustrating a side view of the bracket and the clamp.

FIGS. 3A-3C are diagrams illustrating isometric views of bracket 205 and clamp 100. As illustrated, clamp 100 is attached to bracket 205, and clamp 100 is clamping a conduit 305. FIG. 3D is a diagram illustrating a side view of bracket 205 and clamp 100. Referring to FIGS. 3A-3D and FIGS. 1A-1D, an exemplary process for attaching clamp 100 to bracket 205 is described. A user inserts foot portion 145 through slot 225-2. Referring to FIGS. 3C and 3D, as the user tightens fastener 105, clamp leg 130 turns, which, according to this example, causes curved side surface 148 of locking member 144 to come into contact with surface 240 of side 216 of bracket 205. Thereafter, clamp leg 130 no longer turns. The user may continue to tighten fastener 105 which causes top surface 136 of clamp leg 130 to meet inner surface 126 of clamp body 110. Fastener 105 may continue to penetrate the female threaded passageway of annular cavity 124 and annular cavity 147.

FIG. 4A is a diagram illustrating an exploded, side view of another exemplary embodiment of a clamp. As illustrated, a clamp 400 includes fasteners 105, a clamp body 410, and clamp legs 130. Fastener 105 and clamp 130 has been previously described.

Referring to FIG. 4A, clamp body 410 includes an arm 415 and housings 420-1 and 420-2 (also referred to collectively as housings 420 or individually as housing 420). As illustrated, arm 415 extends from housing 420-1 to housing 420-2 in an arched or curved manner. Arm 415 and housings 420 define a surface 417 contoured to receive a conduit or other object having a curved surface for clamping. Housing 420-1 and 420-2 are symmetrical to each other. Housing 420-1 includes an annular cavity 422-1 and housing 420-2 includes an annular cavity 422-2 (also referred to collectively as annular cavities 422 and individually as annular cavity 420). Annular cavity 422 is contoured to receive clamp leg 130. Additionally, housing 420-1 includes an annular cavity 424-1, and housing 420-2 includes an annular cavity 424-2 (also referred to collectively as annular cavities 424 and individually as annular cavity 424). Annular cavity 424 has a different diameter than annular cavity 422. Annular cavity 424 is contoured to receive fastener 105 and includes female threads. According to an exemplary implementation, surfaces of housings 420 that define openings of annular cavities 424 are substantially flat to receive heads of fasteners 105, as further illustrated in FIG. 4B.

Referring to FIGS. 4A and 4B, during an assembly process, a user inserts leg bodies 135 of clamp legs 130 into annular cavities 422. The user inserts fasteners 105 into annular cavities 424 and annular cavities 147 of clamp legs 130. As the user turns fasteners 105, clamp legs 130 are urged toward clamp body 410. FIG. 4B is a diagram illustrating a side view of an assembled clamp 400. As illustrated, when assembled, clamp 400 does not expose any threading.

FIGS. 4C and 4D are diagrams illustrating isometric views of the clamp 400. FIG. 4D illustrates an inner surface 426-1 of housing 420-1 that defines an opening 427-1 of annular cavity 422-1 and an inner surface 426-2 of housing 420-2 that defines an opening 427-2 of annular cavity 422-2. A female-threaded passageway is provided by annular cavities 424 and annular cavities 447. During the process of assembly, while turning fasteners 105, fasteners 105 urge top surfaces 136 to meet inner surfaces 426 and for openings 137 and 427 to meet.

Figure 5A:
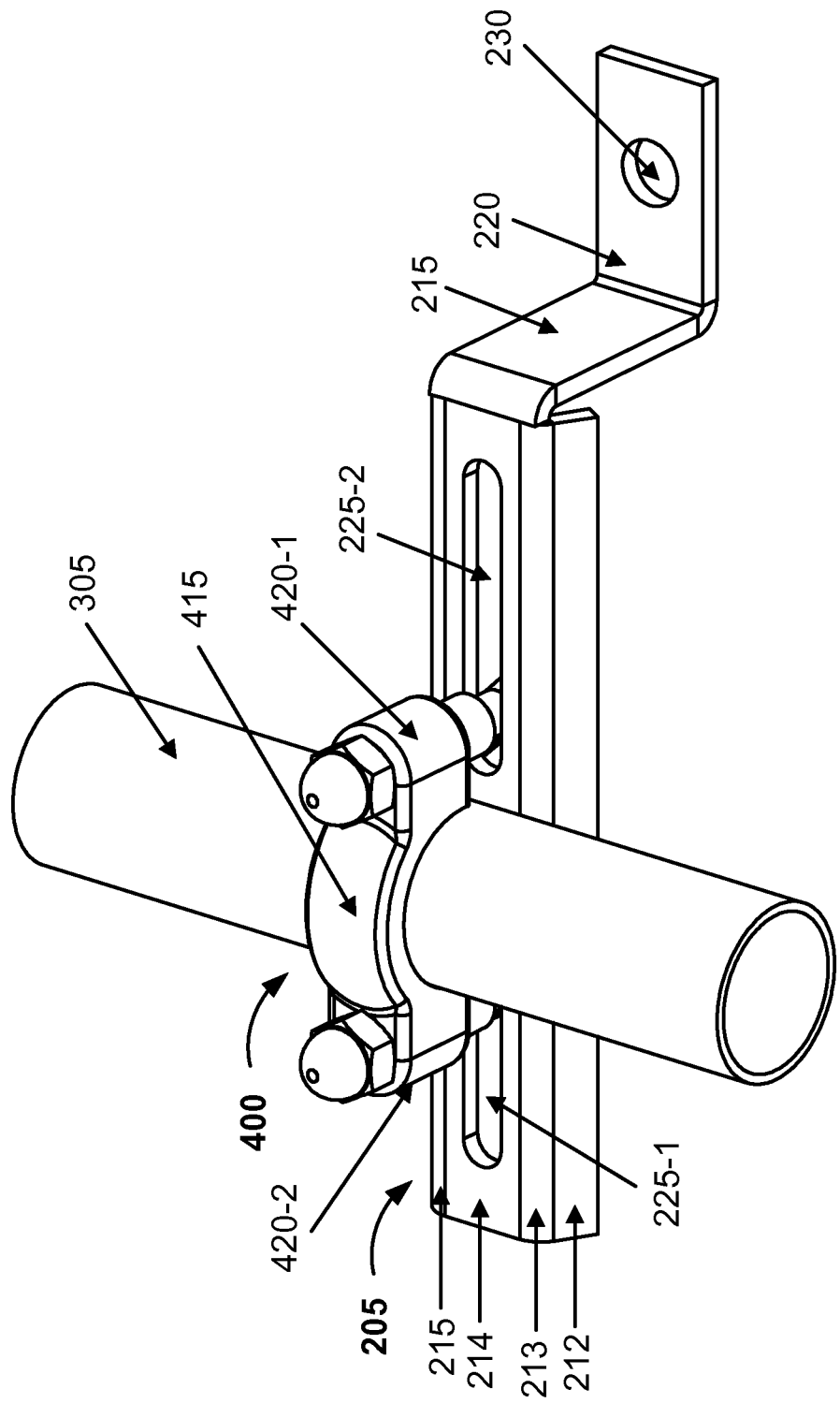
FIGS. 5A-5C are diagrams illustrating isometric views of the bracket and the clamp.
Figure 5B:
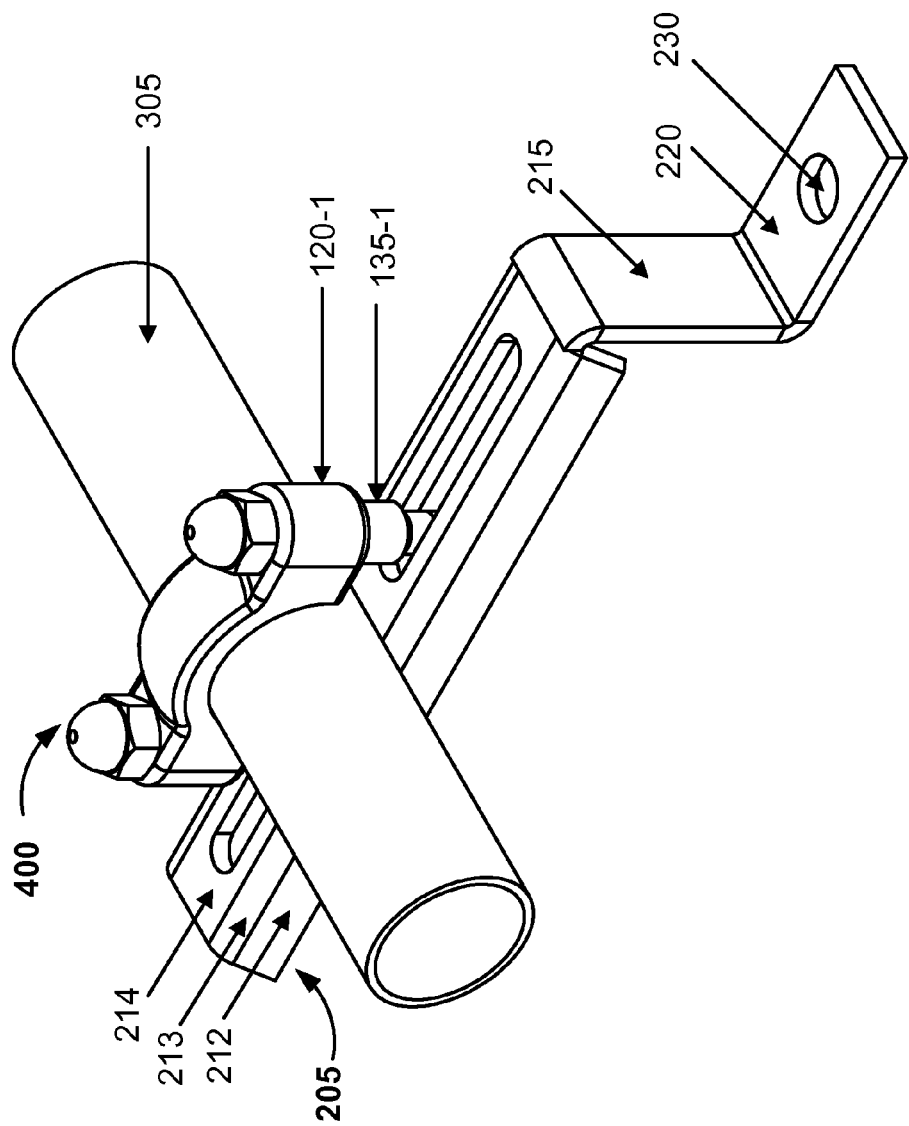
Figure 5C:
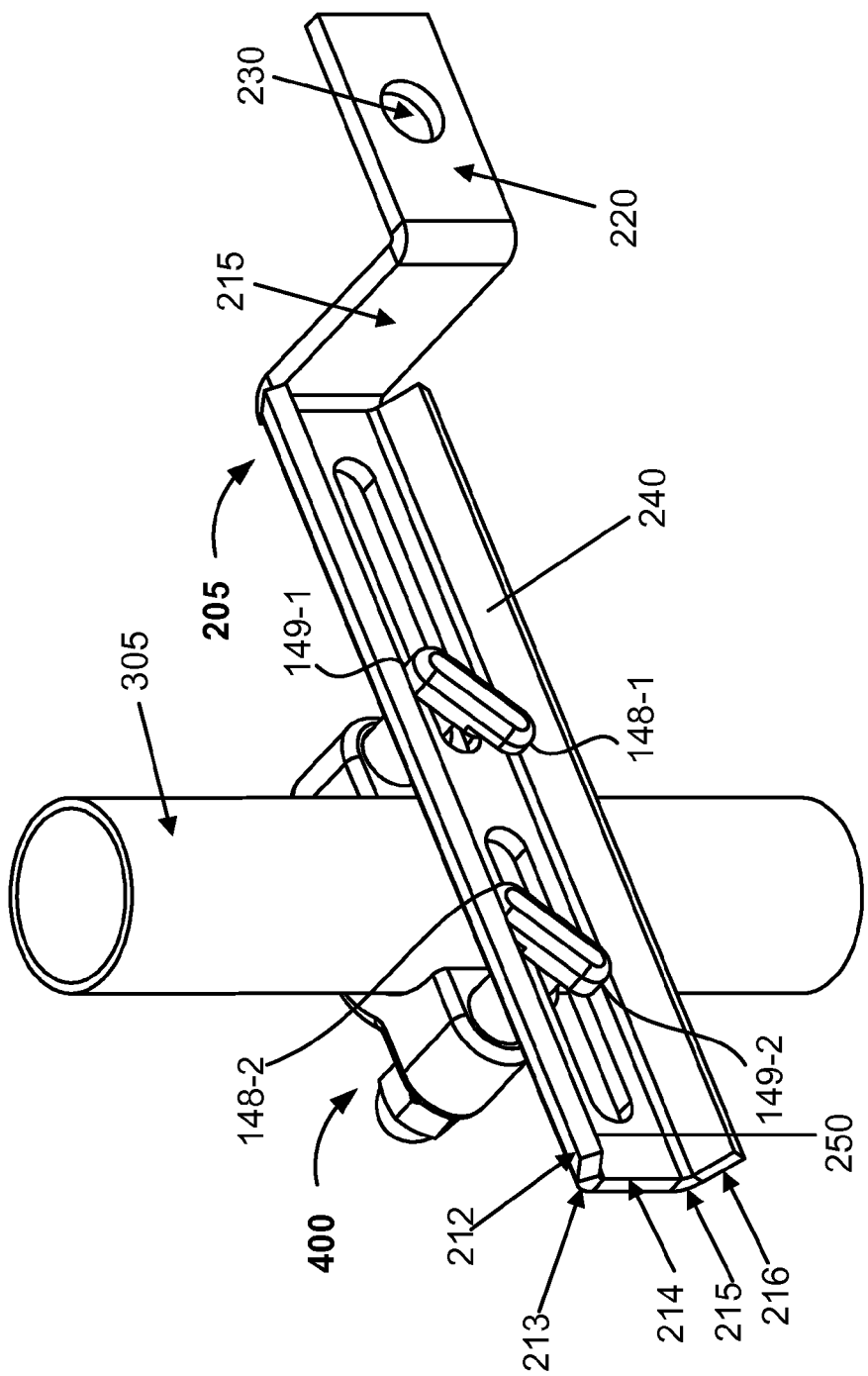

FIGS. 5A-5C are diagrams illustrating isometric views of bracket 205 and clamp 400. As illustrated, clamp 400 is attached to bracket 205 and clamp 400 is clamping conduit 305. Referring to FIGS. 5A-5C, FIGS. 4A-4D, and FIG. 3D, an exemplary process for attaching clamp 400 to bracket 205 is described. A user inserts foot portion 145-2 through slot 225-2 and foot portion 145-1 through slot 225-1. Referring to FIGS. 5C and 3D, as the user tightens fasteners 105, clamp legs 130 turn, which, according to this example, causes curved side surface 148-2 of locking member 144-2 to come into contact with surface 250 of side 212 of bracket 205, and curved side surface 148-1 of locking member 144-1 to come into contact with surface 240 of side 216 of bracket 205. Thereafter, clamp legs 130 no longer turns. The user may continue to tighten fasteners 105 which cause top surfaces 136 of clamp legs 130 to meet inner surfaces 426 of clamp body 410. Fasteners 105 may continue to penetrate the female threaded passageway of annular cavities 424 and annular cavities 147.

Figure 6:
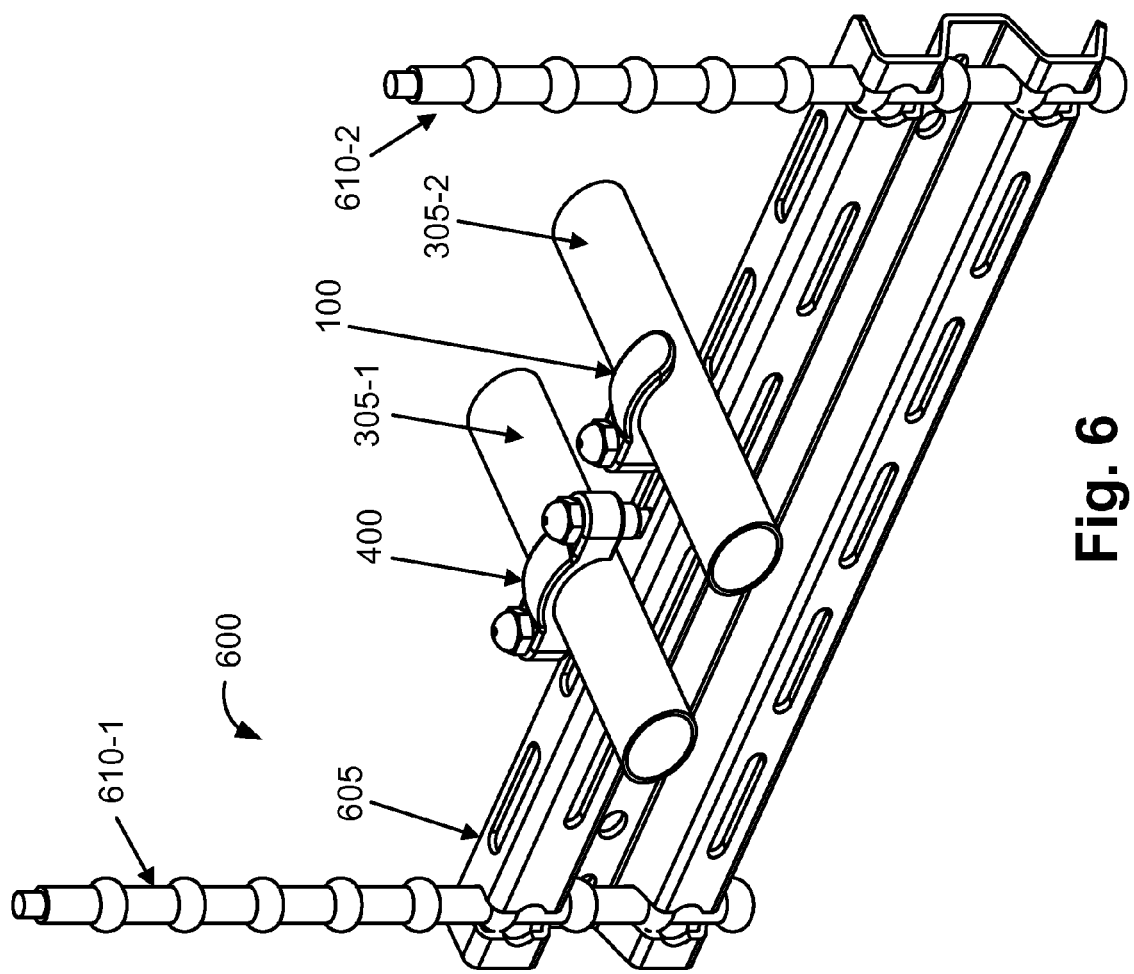
FIG. 6 is a diagram illustrating an isometric view of the clamps and a strut system.

FIG. 6 is a diagram illustrating an isometric view of clamps 100 and 400 and a trapeze strut system 600. As illustrated, clamp 400 and clamp 100 may be affixed to trapeze strut system 600. According to this example, strut system 600 includes a slotted strut 605 and beaded rods 610-1 and 610-2. According to other examples, clamps 100 and 400 may be attached to a wall-mounted strut or other slotted fixture. Clamps 400 and 100 clamp conduits 305-1 and 305-2.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

Spatially relative terms, such as "top," "side," etc., may be used herein for ease of description to describe one element's or feature's relationship to another element or feature as illustrated in the figures. The spatially relative terms are intended to encompass different orientations of the element. For example, if the element in the figure is turned over, an element described as "below" or "beneath" another element or another feature would then be oriented "above" the other element or the other feature.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s).

The foregoing description of embodiments provides illustration, but is not intended to be exhaustive or to limit the embodiments to the precise form disclosed. Accordingly, modifications to the embodiments described herein may be possible. Thus, although the invention has been described in detail above, it is expressly understood that it will be apparent to persons skilled in the relevant art that the invention may be modified without departing from the spirit of the invention. Various changes of form, design, number of, and/or arrangement may be made to the invention without departing from the spirit and scope of the invention. Therefore, the above-mentioned description is to be considered exemplary, rather than limiting, and the true scope of the invention is that defined in the following claims.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A clamp comprising:
a fastener including threads;
a clamp body comprising:
 a housing including a cavity configured to receive the fastener and a housing cavity, wherein the cavity and the housing cavity form a passageway through the housing, wherein a first surface of the housing defines an opening of the cavity, and a second surface of the housing defines an opening of the housing cavity; and
 a curved arm integrally formed to the housing and extending from the housing, wherein the curved arm includes an inner surface having a curved contour configured to receive a conduit; and
a clamp leg comprising:
 a leg body including a leg cavity; and
 a foot member, wherein the leg body is integrally formed to a surface of the foot member,
 wherein the clamp body and the clamp leg are attachable to and detachable from each other, and wherein a portion of the leg body can be inserted into or removed from the housing cavity, and wherein when the portion of the leg body is inserted into the housing cavity, the cavity and the leg cavity form a threaded passageway for the fastener, and wherein the fastener can couple the clamp body to the clamp leg when engaged with the threaded passageway such that the threads of the fastener are not externally exposed, and wherein the surface of the foot member faces the second surface of the housing and is configured to urge against a support bracket.

2. The clamp of claim 1, wherein the cavity and the housing cavity are annular, and a diameter of the cavity is different from a diameter of the housing cavity.

3. The clamp of claim 1, wherein the cavity and the leg cavity are annular, and a diameter of the cavity is substantially the same as a diameter of the leg cavity.

4. The clamp of claim 1, wherein the foot member extends substantially perpendicular relative to the leg body.

5. The clamp of claim 4, wherein the foot member comprises:
a first member that extends substantially perpendicular to the leg body, wherein the first member includes the surface of the foot member; and
a second member that extends substantially perpendicular to the leg body, wherein the first member is formed on the second member, and wherein the second member extends further outward relative to the first member to form a step, and wherein the second member includes a surface facing the second surface of the housing and is configured to urge against the support bracket.

6. The clamp of claim 1, wherein the leg body comprises:
a tapered portion that forms to a tubular portion, wherein the tubular portion is integrally formed to the surface of the foot member.

7. The clamp of claim 1, wherein a surface of the housing is formed to receive the conduit.

8. The clamp of claim 1, wherein the cavity and the leg cavity each include female threads.

9. A clamp comprising:
a first fastener including threads;
a second fastener including threads;
a clamp body comprising:
 a first housing including a first cavity configured to receive the first fastener, and a first housing cavity, wherein the first cavity and the first housing cavity form a passageway through the first housing, wherein a first surface of the first housing defines an opening of the first cavity, and a second surface of the first housing defines an opening of the first housing cavity;
 a second housing including a second cavity configured to receive the second fastener, and a second housing cavity, wherein the second cavity and the second housing cavity form a passageway through the second housing, wherein a first surface of the second housing defines an opening of the second cavity, and a second surface of the second housing defines an opening of the second housing cavity; and
 a curved arm integrally formed to the first housing and the second housing, and extending from a portion of the first housing to a portion of the second housing, wherein the curved arm includes an inner surface having a curved contour configured to receive a conduit; and
a first clamp leg comprising:
 a first leg body including a first leg cavity; and
 a first foot member, wherein the first leg body is integrally formed to a surface of the first foot member; and
a second clamp leg comprising:
 a second leg body including a second leg cavity; and
 a second foot member, wherein the second leg body is integrally formed to a surface of the second foot member, and wherein the clamp body and, the first clamp leg and the second clamp leg are attachable to and detachable from each other, and wherein a portion of the first leg body can be inserted into or removed from the first housing cavity, and wherein a portion of the second leg body can be inserted into or removed from the second housing cavity, and wherein when the portion of the first leg body is inserted into the first housing cavity, the first cavity and the first leg cavity form a first threaded passageway for the first fastener, and wherein when the portion of the second leg body is inserted into the second housing cavity, the second cavity and the second leg cavity form a second threaded passageway for the second fastener, and wherein the first fastener can couple the clamp body to the first clamp leg when engaged with the first threaded passageway such that the threads of the first fastener are not externally exposed, and wherein the second fastener can couple the clamp body to the second clamp leg when engaged with the second threaded passageway such that the threads of the second fastener are not externally exposed, and wherein the surface of the first foot member faces the second surface of the first housing and is configured to urge against a support bracket, and the surface of the second foot member faces the second surface of the second housing and is configured to urge against the support bracket.

10. The clamp of claim 9, wherein the first cavity and the second cavity are annular, and a diameter of the first cavity is substantially the same as a diameter of the second cavity.

11. The clamp of claim 9, wherein the first cavity and the first leg cavity are annular, and a diameter of the first cavity is smaller than a diameter of the first housing cavity.

12. The clamp of claim 9, wherein the first foot member extends substantially perpendicular relative to the first leg body and the second foot member extends substantially perpendicular relative to the second leg body.

13. The clamp of claim 9, wherein the first surface of the first housing is parallel to the second surface of the first housing, and the first surface of the second housing is parallel to the second surface of the second housing.

14. The clamp of claim 9, wherein the first foot member and the second foot member each comprises:
a first member; and
a second member, wherein the first member is formed on the second member, and wherein the second member extends further outward relative to the first member to form a step.

15. The clamp of claim 9, wherein the first surface of the first housing and the surface of the second housing are substantially flat to receive a head of the first fastener and a head of the second fastener.

16. The clamp of claim 9, wherein the first cavity, the second cavity, the first leg cavity, and the second leg cavity each include female threads.

17. A clamp, comprising:
a clamp body comprising:
a housing including a cavity and a housing cavity, wherein the cavity and the housing cavity form a passageway through the housing, wherein a first surface of the housing defines an opening of the cavity, and a second surface of the housing defines an opening of the housing cavity; and
a curved arm extending from the housing, wherein the curved arm includes an inner surface having a curved contour configured to receive a conduit; and
a clamp leg comprising:
a leg body including a leg cavity; and
a foot member, wherein the leg body is integrally formed to a surface of the foot member, and wherein the clamp body and the clamp leg are attachable to and detachable from each other, and wherein a portion of the leg body can be inserted into or removed from the housing cavity, and wherein when the portion of the leg body is inserted into the housing cavity, the cavity and the leg cavity form a passageway for a fastener, and wherein the surface of the foot member faces the second surface of the housing and is configured to urge against a support bracket when a fastener couples the clamp body to the clamp leg.

18. The clamp of claim 17, further comprising:
the fastener, wherein the fastener includes threads and wherein when the clamp body and the clamp leg are coupled, the threads of the fastener are not externally exposed.

19. The clamp of claim 17, wherein the cavity and the leg cavity are annular, and a diameter of the cavity is substantially the same as a diameter of the leg cavity.

20. The clamp of claim 17, wherein the cavity and the housing cavity are annular, and a diameter of the cavity is smaller than a diameter of the housing cavity.

\* \* \* \* \*